Sept. 13, 1960

M. J. KOFOID 2,952,296

RADOME ELECTRIC WALL THICKNESS
MEASUREMENT AND CORRECTION

Filed Aug. 17, 1956

INVENTOR.
MELVIN J. KOFOID

BY
Reynolds, Beach & Christensen

ATTORNEYS

Sept. 13, 1960

M. J. KOFOID 2,952,296

RADOME ELECTRIC WALL THICKNESS
MEASUREMENT AND CORRECTION

Filed Aug. 17, 1956

INVENTOR.
MELVIN J. KOFOID
BY
Reynolds, Beach & Christensen
ATTORNEYS

Sept. 13, 1960

M. J. KOFOID 2,952,296

RADOME ELECTRIC WALL THICKNESS
MEASUREMENT AND CORRECTION

Filed Aug. 17, 1956

INVENTOR.
MELVIN J. KOFOID

BY

Reynolds, Beach & Christensen

ATTORNEYS

Sept. 13, 1960     M. J. KOFOID     2,952,296
RADOME ELECTRIC WALL THICKNESS
MEASUREMENT AND CORRECTION

Filed Aug. 17, 1956                   6 Sheets-Sheet 5

INVENTOR.
MELVIN J. KOFOID
BY
Reynolds, Beach & Christensen
ATTORNEYS

United States Patent Office 2,952,296
Patented Sept. 13, 1960

2,952,296

RADOME ELECTRIC WALL THICKNESS MEASUREMENT AND CORRECTION

Melvin J. Kofoid, Seattle, Wash., assignor to Boeing Airplane Company, Seattle, Wash., a corporation of Delaware Filed Aug. 17, 1956, Ser. No. 604,673

29 Claims. (Cl. 154—1)

This invention relates to the measurement and correction of electric thickness of dielectric walls traversed by electromagnetic wave energy, and more particularly to the measurement and correction of the deviations from a predetermined value of the electrical thickness of the walls of radomes for direction finding or direction controlling radar instruments. In general, such measurement is performed by measuring the phase shift of microwave energy propagating through the radome wall at predetermined incidence angle and relative polarization, between relatively fixed transmitting and receiving points. The invention resides in novel method and apparatus aspects and features for performing the measuring and correcting functions and in novel features of the resulting product.

The invention is herein illustratively described by reference to the presently preferred form and practice thereof; however, it will be recognized that certain modifications and changes therein may be made with respect to details without departing from the essential and characterizing features involved.

The invention is primarily and specifically concerned with measurement and correction of nose radomes for aircraft having direction finding or homing microwave radars such as those of the conical scan type. The electric wall thickness of these radomes for microwave systems must be accurate to within very close tolerances of the order of the equivalent of a few thousandths of an inch. Usually they are one-half wave length thick in terms of the propagative wave energy transmitted by the radar. Any material deviation from the optimum thickness in different areas of the radome wall impairs the directional accuracy of the radar by producing an effective change in the direction of propagation of the energy wave fronts and by producing impedance mismatch in the system.

It is not practicably possible by present methods of fabrication to achieve the required dimensional precision with respect to electric wall thickness in the original molding or manufacture of these radomes. This is due in part to the practical difficulty of achieving uniform wall thickness physically. It is also due to the practical difficulty of achieving uniformity of the dielectric constant or index of refraction of the wall material throughout. Variations in either dielectric constant or physical thickness can produce excessive variation in electric wall thickness. Moreover, errors due to these two factors can be additive. It is therefore necessary to measure the electric wall thickness over the entire working area of the radome and correct for deviations from the norm where necessary.

The large size and generally ogival elongated and narrow form of such radomes in certain aircraft applications present special problems with respect to performing both the measuring and correcting functions. The extreme degree of precision with which such measurements and corrections must be made to be of value presents its own special problems. This applies in respect to the precisional requirements of physical apparatus for establishing relative positioning and imparting relative traversing movement between the radome and the microwave test equipment during the measuring operations so that all working areas of the radome wall are exposed to identical electrical measurement conditions. It also applies in respect to the precisional requirements of coordinating the measurement information with the aplication of corrections in measured amounts and at designated wall locations of the radome.

A general object of the invention therefore is the provision of a practical method and apparatus for achieving the described results while overcoming the foregoing difficulties inherent therein.

Another object of the invention is to provide an improved method and apparatus for manufacturing radomes and like articles with precisely controlled electrical thickness. A related object is such a method and apparatus by which such radomes may be completed rapidly and economically. More specifically, it is an object to provide such a method which permits initially forming a radome with approximate accuracy as to physical wall thickness by conventional fabrication techniques, readily executed, and thereupon rapidly, economically, and permanently correcting the effective electrical wall thickness with the necessary degree of precision.

It is also an object to provide a radome the effective electrical wall thickness of which is more accurately uniform or controlled in its value than has been practically attainable heretofore.

Another object is a novel method and apparatus for correctively altering electric wall thickness of an elongated, hollow dielectric figure by applying the thickness-corrective media to the interior thereof, whereby any original finish or smoothness imparted to the exterior surface thereof, as in the case of aircraft nose radomes, may be left completely undisturbed.

In brief general terms the novel method proceeds on the interferometer principle, applying systematically to all working areas of the radome the measurement of electrical phase shift produced by the radome wall with respect to microwave energy transmitted therethrough with predetermined incidence angle and polarization and between relatively fixed points in space. Deviations in measured phase shift from the optimum value or norm, are utilized, preferably after recording of such deviations, to control a correction applicator. As the latter is caused systematically to scan successive zones of the radome wall area its operation to apply electrical wall thickness corrections thereto is controlled automatically by a graph line monitoring device which correspondingly scans the graphical record made by said measurement procedure and senses graph line deviations beyond a predetermined norm as the basis for such corrections.

In accordance with the preferred technique followed the radome is originally fabricated with the wall made purposefully slightly thin so that, with respect to the test microwave energy being transmitted through it no area presents an apparently greater electric thickness than the optimum value, though various specific areas will inevitably be thinner than the optimum value. Then thickness increasing corrections are applied in the form of adhesively covered dielectric tape at successively spaced locations in areas indicated to be electrically thin by the graphical record which controls operation of the correction applicator. It is found that the patches need not be contiguously arranged, but may be spaced apart at fairly wide intervals, yet will produce the effect of contiguity thereof inasmuch as the radar beam width is still many times greater than the patch interval and therefore unable to resolve actual differences in electric wall thickness between mutually adjacent patched and unpatched areas. Taking advantage of this integration effect and applying similar correction units in noncontiguous locations greatly simplifies and expedites the correction procedure and permits following a systematic method which produces the desired precisional accuracy in the finished product; moreover, it has other advantages which will appear more fully hereinafter.

In addition, to the foregoing and other method aspects, various features of the invention also reside in the novel automatic correction tape applying device operatively positioned to scan and apply correction patches to the radome interior, in the novel controls for the automatic correction device, including the patch length and patch interval selector means therein, in the automatic record tracking apparatus operating such controls and including the "curve hopper" feature employed therein, in the apparatus for supporting and moving the radome in predetermined systematic manner relative to the microwave test apparatus for scanning and measuring the radome wall throughout its entire working area, including the curved carriage track related in form to the radome contour in order to maintain constant test beam incidence angle and constant spacing between the transmitting test antenna and radome wall, and in the precision interferometer type apparatus for measuring and recording accurately electric wall thickness deviations from a predetermined value.

These and other features, objects and advantages of the invention will become more fully evident from the following description thereof by reference to the accompanying drawings illustrating the essentials of the preferred embodiment.

Different methods and materials are, of course, available for basically fabricating radomes suitable as microwave radar housings. Commonly radomes for direction-indicating radar installations in the nose ends of aircraft such as guided missiles, are in the form of solid dielectric walls one-half wave length thick. Usually formed as elongated ogival figures of revolution, these radomes are so critical as to electrical wall thickness that the accuracy limitations of conventional fabrication techniques are excessive. The principal method of basic fabrication is to lay up a plurality of layers of glass fiber cloth on a mandrel and impregnate the cloth with a hard and dense resin until the desired thickness is achieved as closely as possible. Many rejects result from such a method because not only is it virtually impossible to obtain consistently uniform thickness physically but it is practically impossible to avoid appreciable variations in the effective index of refraction of the wall in different areas due to variations in the relative proportions of glass fiber cloth and resin material in the different areas.

Also it will be appreciated that the exterior surface of high velocity of aircraft should be finished smoothly. Accordingly, the presently preferred procedure of thickness correction employing the spot patching technique described is to apply electrical wall thickness correction patches to the interior surfaces of the radome.

In general it is possible to follow either of three different approaches to the problem of fabricating radomes and correcting them for electrical wall thickness deviations from a norm. One technique is to fabricate the radome initially with a thickness which generally exceeds the desired electrical thickness, at least in areas, and to grind off or otherwise compensate for the excess thickness as and where necessary. A second method is to fabricate the radome as closely as possible to the correct thickness so that the variations of thickness occur both as excesses and deficiencies of thickness, whereby it becomes necessary to grind off or otherwise compensate for the excess material in certain areas and to add material or electrical thickness corrections in other areas. The third and presently preferred technique, as previously mentioned is to manufacture the radome slightly thinner electrically than the required thickness, at least in areas, with a maximum thickness not materially exceeding the precise value required, and to apply dielectric tape to selected areas of the radome for increasing the effective electrical thickness of these areas to the correct value.

An important object of the method used is the application of the pieces of tape of uniform length at a plurality of separate, noncontiguous locations, with a predetermined minimum spacing therebetween, in those areas requiring thickness modification. As previously mentioned the use of separated "spot" corrections has the effect of uniformly correcting the thickness of the radome wall over a much larger effective area than the actual area covered by the pieces of tape or other thickness correction elements. Moreover, it is readily possible in this manner to control the amount of correction, as herein, by applying the corrections "soft," that is in a manner avoiding overcorrection, and remeasuring and recorrecting one or more times until the desired precisional accuracy is achieved in the final product. The dimensional requirements of the individual pieces of tape to impart a substantial correction to the radome wall thickness without overcorrecting will be determined by experience with particular radomes and will vary with the basic fabrication materials and techniques used.

Figures 1, 1A:
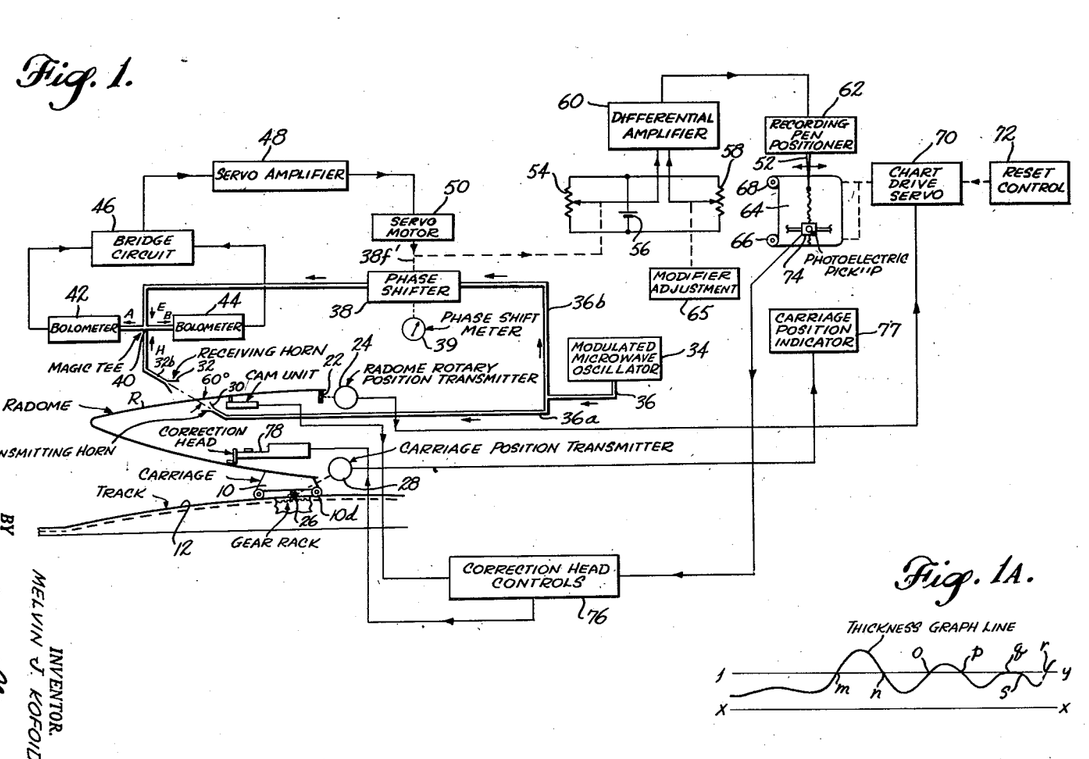
Figure 1 is a simplified schematic diagram of the measurement and correction apparatus in its preferred form.
Figure 1a is a representative graph illustrating the type of record made by the measurement apparatus and certain problems in monitoring the graph line deviations for correction head control purposes.
Figure 2:
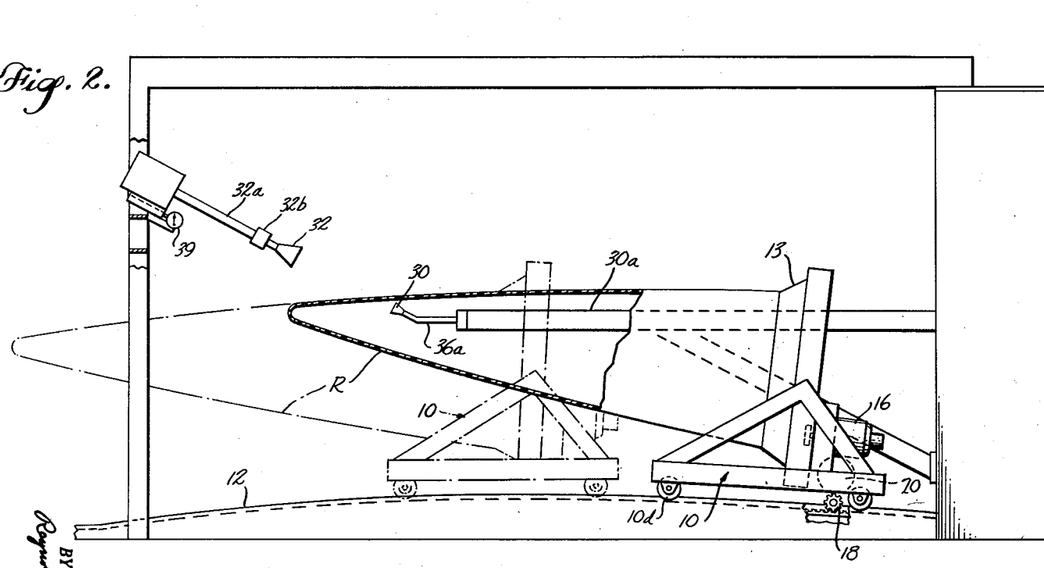
Figure 2 is a simplified side elevation view of the physical arrangement for supporting and moving a radome in test position relative to a microwave transmitter and receiver for conducting electrical wall thickness measurements.
Figures 4, 5, 6:
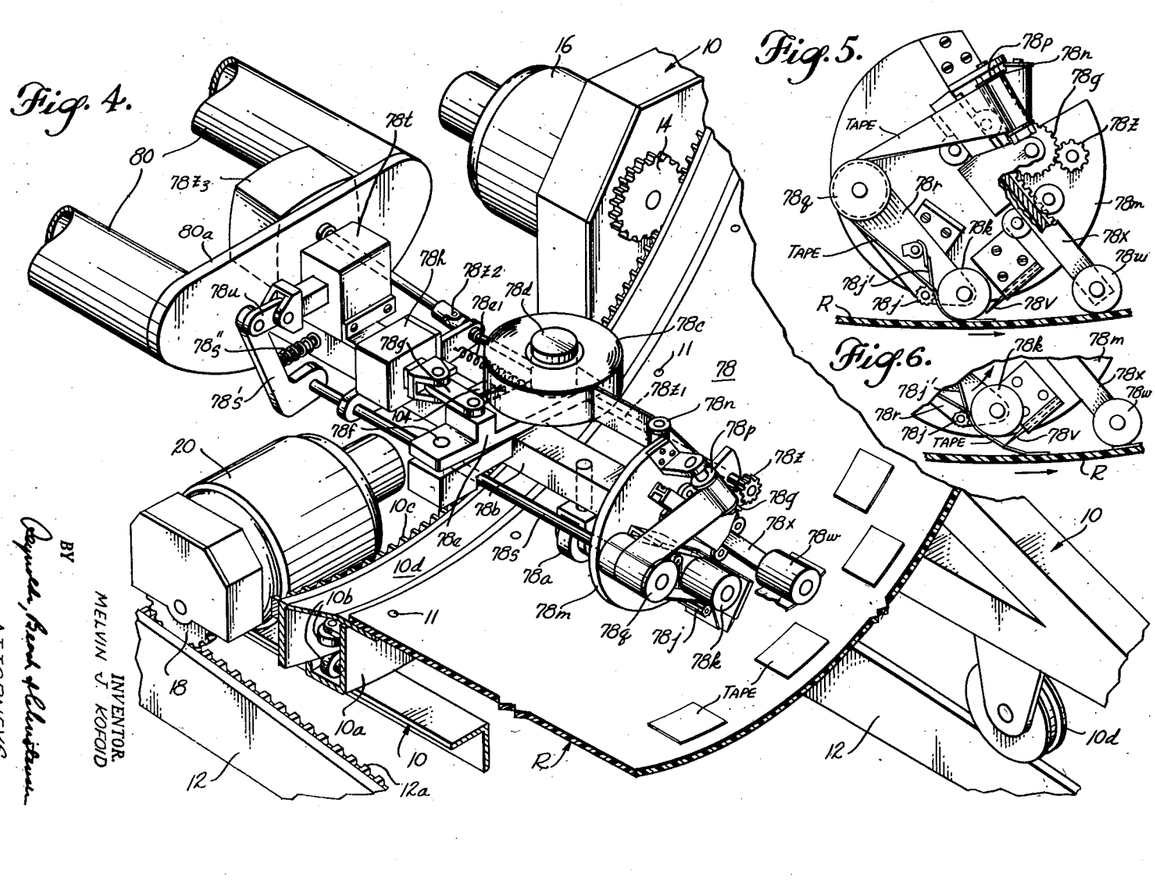
Figure 4 is a perspective view of the correction head in the form of an automatic taping device, the view showing a portion of a radome being corrected, together with portions of the radome supporting and moving apparatus.
Figure 5 is an end view of the taping head in the process of laying a length of tape.
Figure 6 is a fragmentary end view of the taping head in the process of severing the length of tape being laid.

In Figures 1 and 2 the elongated ogival radome R is supported on the carriage 10 for rotation thereon about the longitudinal axis of the radome and for generally longitudinal movement of the radome on the carriage tracks 12. The radome is supported on the carriage with the longitudinal axis of the radome disposed generally horizontal, although because of track curvature in vertical planes and for a reason to appear the attitude of the axis changes progressively as the radome is moved along the tracks. As shown in Figure 4, the radome is temporarily secured by bolts 11 to the revolving support ring 10d comprising part of the carriage 10. The ring 10d has a ring gear 10c which extends around its periphery and the support ring is guided for rotation in the bearing ring 10a having roller bearings 10b at locations therearound which permit the radome to be revolved freely about its longitudinal axis on the carriage without changing the relative bodily position of the radome thereon in any direction. A pinion 14 meshes with the teeth of the ring gear 10c and is driven by the motor 16 in order to revolve the radome.

Carriage 10 is provided with two pairs of wheels 10d which run on the pair of tracks 12, as shown. A gear rack 12a extends along one of the tracks and is engaged by a pinion 18 driven by a motor 20 mounted on the carriage 10 to effect translatory movement of the carriage along the tracks.

The pinion 22 engages the ring gear 10c and rotates a position transmitter 24, such as a selsyn, in accordance with rotation of the radome about its longitudinal axis. A pinion 26 engages the gear rack 12a and rotates a carriage position transmitter 28 such as a selsyn. The function of these position transmitters will be described hereinafter.

The transmitting horn 30 is supported by a carriage arm 30a to direct a microwave test beam outwardly through the radome wall toward a receiving horn 32 supported in alignment therewith by an arm 32a. The two horns are aligned in a vertical longitudinal plane containing the axis of the radome in test position. The test beam passes through the upper side of the radome in the example. The transmitting apparatus feeding horn 30 through wave guide 36a, and the related microwave components are not illustrated in detail. The same is true of the microwave receiver connected to horn 32 through wave guide 32b. The transmitting horn 30 is directed generally forwardly of the radome, i.e. towards the tip thereof, with the axis of the horn disposed at approximately sixty degrees to a longitudinal line on the radome intersected by the axis of the horn, representing Brewster's angle of incidence, which produces minimum reflection from the radome wall back into the horn. Absorbtive material is used (not shown) surrounding the horns, and other known precautions against energy reflections into horn 30, which reflections might impair the measurement accuracy. Reflection from the radome itself is minimized by using parallel polarization of the best beam.

The function of the curved track is not only to maintain constant the spacing between the transmitting horn and said point of intersection, but the angle of incidence of the horn beam. These quantities are held constant to avoid test condition variations which could affect the measurement accuracy.

The tracks 12 extend in parallel vertical planes and are curved in those planes in accordance with the contour of the side of the radome, namely the upper side thereof, through which the test beam of microwave energy is passed for purposes of electrical wall thickness measurement. In the illustration the radome curves longitudinally approximately in a circular arc. Thus in order to maintain constantly relative spacing and incidence angle between the energy transmitting horn 30 and the radome wall the track curvature is also circular, with the arc of the track circle being concentric with the arc of the radome wall contour circle. The effect of the radome on the microwave energy beam transmitted from the horn 30 to the horn 32 is determined by the electrical wall thickness of the radome and can be measured by comparing the difference in phasing between microwave energy directly from the stable-frequency microwave oscillator 34 and microwave energy received in the receiving horn 32 after passing through the radome wall. This difference of electrical phasing varies with variations in electrical wall thickness of the radome. In effect, the apparatus measures electric wall thickness variations by measuring the variations of this difference in electrical phasing, or the deviations thereof from a predetermined norm, in a succession of circumferentially extending zones located successively along the length of the radome. Calibration of the apparatus is performed with the radome removed.

In order to perform the desired phase difference measurement the stable-frequency microwave oscillator 34 (such as a stabilized klystron) is preferably modulated at a convenient stable audio frequency such as one thousand cycles per second and delivers its modulated output energy to the wave guide 36. One branch of this wave guide, 36a, leads to the transmitting horn 30 and the remaining branch 36b extends through a phase shifter 38 to the E arm of a conventional magic tee 40. The receiving horn is connected to the H arm of the magic tee. Identical bolometers 42 and 44 are respectively mounted in the side arms A and B, representing the output arms of the magic tee. These bolometers are connected to opposite sides of a normally balanced bridge circuit 46. When the output detected signal intensities of the bolometers, representing the 1000 c.p.s. modulation envelopes, are balanced the bridge circuit delivers zero error signal to the servo amplifier 48. When one bolometer is heated by microwave energy more greatly than the other an unbalance occurs in the bridge circuit which produces an error signal delivered to the servo amplifier. Servo amplifier 48 energizes the servomotor 50. The latter is connected to an adjustable element in the phase shifter 38. The circuit polarities and drive connections are such that the servomotor constantly readjusts the phase shifter in a sense to establish that value of microwave energy phase shift in the wave guide branch 36b which will restore balanced energization of the two bolometers. Thus the adjusted position of the phase shifter constitutes a measure of electrical phase shift produced by the radome wall, hence of its electric thickness. A gauge or meter 39 registers the position of the phase shift element of the phase shifter for convenience in calibration, and inspection of test conditions.

Figure 11:
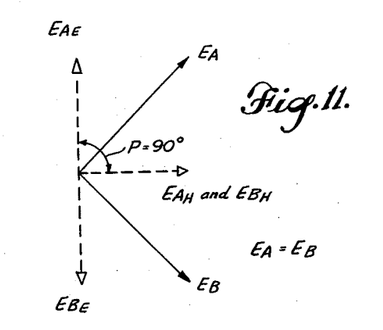
Figures 11, 12 and 13 are vector diagrams illustrating the operation of the magic tee and balanced bolometer detector arrangement appearing in Figure 1, which converts electrical phase differences into amplitude responses for varying the phase shifter adjusting means in order to obtain a measure of electric wall thickness for recording purposes.
Figure 12:
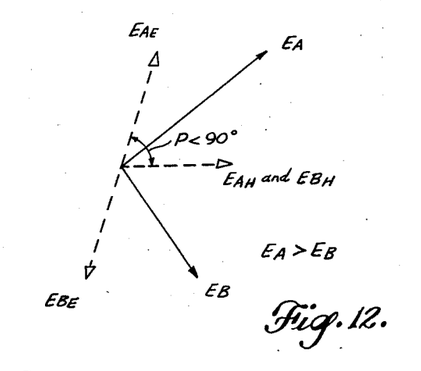
Figure 13:
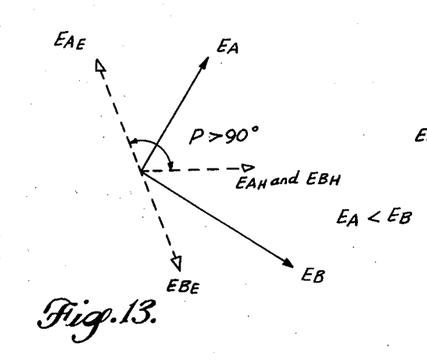

Figures 11, 12 and 13 illustrate the specific manner in which the combined magic tee and balanced bolometers convert phase differences between the microwave energy delivered to the magic tee through the E arm and microwave energy delivered thereto through the H arm into bolometer responses for the foregoing purpose. In Figure 11 the component of voltage in the A arm resulting from energization through the E arm is designated $E_{AE}$. The similar component of voltage in the B arm of the same source is designated $E_{BE}$. These are vectorially related in direct phase opposition. The component of voltage in the A arm resulting from energization through the H arm is identical with the component of voltage in the B arm resulting from the same energization; consequently the vectors $E_{AH}$ and $E_{BH}$ coincide. If the energy entering the E arm is 90° out of phase with the energy entering the H arm the vectors are perpendicular as shown in Figure 11 and the net voltages $E_A$ and $E_B$, respectively, are of equal amplitudes. This represents the condition of equal energization of the bolometers 42 and 44 and balance of the bridge circuit 46 resulting in zero energization of the servomotor 50. If, however, the phase angle P between the E arm energy and the H arm energy is less than 90° the vector $E_A$ will exceed the vector $E_B$ as shown in Figure 12. This results in greater energization of the bolometer 42 than of bolometer 44 and the resulting unbalance of the bridge circuit produces energization of the servomotor 50 in order to adjust the phase shifter in a sense to restore the balance condition depicted in Figure 11. In Figure 13 the phase difference between energy delivered to the E arm and that delivered to the H arm exceeds 90° with the result that the B arm voltage exceeds the A arm voltage and the servomotor is energized in the opposite sense to adjust the phase shifter in order to restore the balance depicted in Figure 11. Thus the existing setting of the phase shifter 38 constitutes a measure of the phase shift which the radome wall imparts to the microwave energy beam transmitted from the horn 30 to the horn 32, hence a measure of the electrical wall thickness of the radome.

Figure 7:
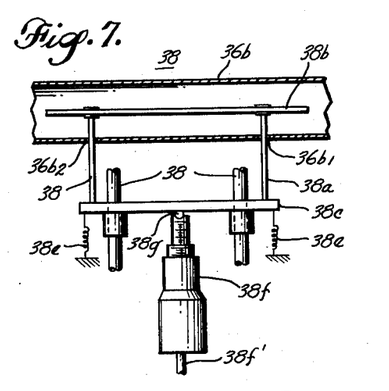
Figure 7 is a simplified side view of the adjustable phase shifter apparatus of a type employed in Figure 1.

A suitable phase shifter is illustrated in Figure 7, wherein the wave guide 36b, assumed to be of rectangular form operated in its fundamental mode has two openings 36b1 and 36b2 in one narrow side wall thereof. Metal slide rods 38a pass through these openings and support quartz plate 38b within the wave guide, with the plane of the plate disposed perpendicular to the broad walls of the wave guide and parallel to the narrow walls thereof as shown (i.e. in the E-vector plane). The effect of the dielectric plate 38b is to advance the electrical phasing of energy propagating through the guide, and the nearer the plate is to the middle of the guide, the greater is the amount of phase advance which it produces. By withdrawing the plate toward the apertured side of the guide, the phase advance produced by the plate may be reduced from a maximum toward a minimum. The outer ends of the rods 38a are supported by a bar 38c which is slidably mounted on the parallel guide rods 38d extending parallel to the rods 38a. The springs 38e are provided to urge the supporting bar 38c in the direction of withdrawal of the quartz plate 38b from its position of maximum phase effect. Such springs thereby hold the crossbar 38c firmly against the movable end of the micrometer type actuating device 38f having an input shaft 38f' adapted to be turned in either direction by the servomotor 50 (Figure 1). A pivotal bearing element 38g is interposed between the crossarm 38c and the actuating end of the micrometer unit 38f in order to prevent possible twisting of the crossarm due to misalignment of the micrometer unit with the direction of extent of the guide rods 38d. In this manner the quartz plate 38b is accurately moved always parallel to itself, in order to have the rotated position of the micrometer control shaft 38f' always an accurate measure of the amount of phase shift produced by the phase shifter, constituting an accurate measure of the electrical wall thickness of the radome.

As previously mentioned the electrical wall thickness deviations are recorded and the record is then used to control the application of wall thickness corrections to the radome. Recording of the electrical wall thickness deviations from the desired norm is accomplished by utilizing generally conventional apparatus for converting the rotary position of the phase shifter control shaft 38f' into displacement of the recording pen 52. For this purpose the shaft 38f' is connected to the wiper of a potentiometer 54, the winding of which is connected across a voltage source 56 and across the winding of a second potentiometer 58. The respective wipers of the two potentiometers 54 and 58 are connected electrically to the opposite sides of the input of a differential amplifier 60, the output of which operates the recording pen positioning device 62 indicated schematically in Figure 1. The setting of the wiper of potentiometer 58 is established by the modifier adjustment 65, which may simply be a manual adjust-knob, or it may constitute a device which is varied in its adjustment as a function of changes in radome position during the measurement process. The setting of potentiometer 58 determines the transverse position of the recorded graph line on the graph paper hence serves as a means to preadjust the base value or norm of the record in relation to the photoelectric pickup to be described.

The graph paper 64 on which the pen 52 records is rolled on the roll 66 from the roll 68 by operation of the chart drive servo 70, synchronized with the radome rotary position transmitter 24. The measurement procedure is performed systematically by scanning and recording successive circumferential zones on the radome commencing at one end and working progressively toward the opposite end. Each predetermined length of graph paper represents a different zone and every position along such length of graph paper corresponds to a distinct point around the circumferential zone instantaneously being scanned by the microwave test beam. A reset control 72 is provided in order to permit selecting different positions along the chart for scrutiny or for selecting different zonal recordings for "playback" in making corrections or for rewinding the graph paper in order to initiate a systematic correction operation in which the photoelectric pickup 74, mounted in fixed position transversely of the length of the strip of chart paper 64, is caused to scan the lengths of graph line in successive order in order to produce control signals for operating the correction head controls 76. A carriage position indicator 77 operated by the carriage position transmitter 28 enables the operator to correlate carriage position along the tracks with the different circumferential zone recordings made on the chart.

The correction head 78 is controlled by the photoelectric pickup to apply thickness modification corrections to the internal wall surface of the radome when the recorded wall thickness graph line deviates above a value corresponding to the maximum permissible electrical wall thickness of the radome, such as line Y—Y in Figure 1A. In this figure reference line X—X corresponds to the minimum tolerable value of thickness of the radome wall in any location, which is not appreciably more than the actual minimum electrical wall thickness of the uncorrected radome in any area. The objective is to correct the electric wall thickness where necessary so that it lies between the lines X—X and Y—Y in all areas. When the graph line shown deviates to the side of the line Y—Y away from line X—X, the photoelectric pickup responds in a manner causing the correction head controls to operate the correction head 78 as will hereinafter be more fully described.

Figure 3:
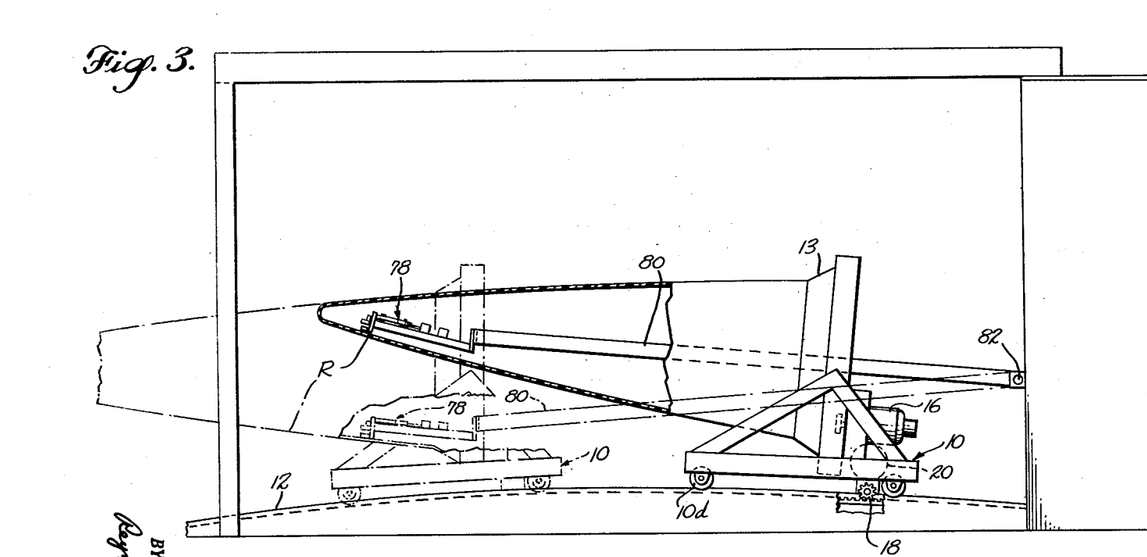
Figure 3 is a similar view showing the arrangement of the correction head in relation to the same radome supporting and moving apparatus.

As previously mentioned, the concentric arcuate curvature of the carriage tracks 12 and the longitudinal contour line of the radome scanned by the microwave energy test beam insures, during the electrical wall thickness measurement procedure, the maintenance of constant spacing between the transmitting horn 30 and the radome wall and constant incidence angle between the axis of the transmitting horn and the longitudinal line of the radome at the point of intersection of such axis therewith. Moreover, with the radome supported in the carriage with the longitudinal axis of the radome contained in a vertical plane as shown, the polarization of the microwave test beam energy remains constant in relation to the radome wall throughout the test. Such a radome carriage and track arrangement also lends itself directly to a convenient and effective support for the correction head 78 by which the correction tape applicator is maintained in substantially constant relationship with the instantaneous portion of the radome wall engageable thereby in all adjusted positions of the carriage along the track. For convenience the correction head 78 is mounted on the end of an elongated arm structure 80 pivoted on a horizontal axis defined by the fixed support 82 which lies beyond the endmost position of travel of the carriage 10 along the tracks in the direction from the tip toward the base of the radome. The arm structure 80 supports the correction applicator to engage the lower wall of the radome. It will be seen that as the radome moves in the direction from its base toward its tip along the track 12 the inclination of the portion of the wall instantaneously engageable by the applicator progressively decreases (i.e. from the solid line position to the broken line position in Figure 3), but so does the inclination of the arm structure 80 supporting the correction applicator. The result is that the attitude of the correction applicator in relation to the radome wall portion engageable thereby remains substantially constant. It will be evident that the same tracks and carriage may be used for the radome during the measurement and correction operations and that these operations may be performed completely separately or, if the space within the radome permits, at the same time. If the two operations are performed at the same time, the test beam being passed through one part of the wall and the tape applicator being applied to a different part of the wall, the measurement recording and playback procedure will be conducted simultaneously such that each point of the record is scanned by the pick-up device a fraction of a revolution of the radome after the recording thereof. However, in the preferred practice of the invention a complete graphic recording of the electric wall thickness deviation of the radome from the desired value is made in all circumferential zones of the radome before the correction procedure is initiated. In this way the correction applicator may be removed from within the radome during making the recordings so that its presence cannot affect the accuracy of the results by disturbing the microwave test beam pattern.

Figures 3, 4, 5 and 6 illustrate the essential features of the mounting and of the construction and mode of operation of the correction applicator in the form of the taping head 78. This unit is mounted on the end plate 80a of the pivoted supporting arm structure 80. The arm structure and the correction applicator are manufactured of light weight materials so that a minimum of weight is imposed thereby on the underlying radome wall through the caster wheel 78a, which supports the correction head in fixed relation to the radome interior surface engageable by the tape applicator roll 78k. A support arm 78b projects from the base plate 80a and mounts the caster wheel 78a near the projecting end of the arm. A supply roll of dielectric adhesively coated tape 78c is carried on a vertical pin 78d which in turn projects upwardly from the end of the generally horizontal supporting arm 78e pivotally mounted at 78f on a lateral extension of the arm 78b. The tape-carrying arm 78e is connected through a link 78g to the armature of a solenoid 78h which when energized draws the roll of tape in the direction from the projecting end towards the base end of the correction applicator by a predetermined distance. The function of this retracting operation is to strip a length of tape from the roll to which it is adhesively stuck, thus freeing the tape for use in application to the radome. During such retracting operation the tape is gripped between a toothed wheel 78j locked by a dog 78j', and the tape applicator roll 78k mounted on the lower end of the swinging arm 78r. The slack of tape thus stripped from roll 78c is taken up by spring 78e1, which tends to hold the arm 78e in deflected position. In reaching the tape applicator roll 78k the tape passes from the supply roll around a guide roll 78n, then around the inclined guide roll 78p which turns the tape from a substantially vertical plane to an inclined plane and inwardly across the face of plate 78m, then around the guide roll 78q which reverses the direction and changes the plane of the tape appropriately to feed between roll 78k and wheel 78j with the adhesive side facing downwardly against the adjacent radome wall. Roll 78q is coaxial with the pivot axis for arm 78r. The slack take-up deflection force exerted by the spring 78e1 on arm 78e is not great, and the spring yields as tape is applied to the radome. With the tape roll arm 78e maintained in its limit position by the spring 78e1 a switch 104 is held closed by the arm for a reason to be explained subsequently in connection with Figure 10.

The pivotal support for the arm 78r comprises a rotatable shaft 78s which extends parallel to the support arm 78b from the arm 78r to the base of the correction head where it carries a bell crank 78s'. The bell crank is urged by the spring 78s" toward a position raising the arm 78r upwardly away from the radome surface where the end of the tape is held out of contact with the radome wall. A solenoid 78t connected to the end of the bell crank 78s' by a link 78u rotates the shaft 78s to press the applicator roll 78k, hence the tape thereon, downwardly against the radome surface for applying a length of tape thereto, as shown in Figure 5. Upon deenergization of the solenoid 78t, spring 78s" promptly raises the arm 78r. A knife 78v is fixed on the correction head with its horizontally disposed cutting edge extending longitudinally of the correction applicator immediately adjacent the side of the roll 78k opposite the toothed wheel 78j. As the arm 78r is snapped upwardly, the tape is drawn past the cutting edge 78v because of the adherence of its end to the radome surface and is thereby severed, as shown in Figure 6. It will be appreciated that constant-speed rotation of the radome about its longitudinal axis accompanying depression of the arm 78r carrying the applicator roll 78k causes the tape to be applied to the radome surface and that the period of dwell of the arm 78r thereby determines the length of the piece of tape applied to the radome surface. This dwell period is determined by operation of the correction head controls to be described in connection with Figure 10 so that tape strips of constant length are applied to the radome wherever corrections are made.

After the applied piece of tape is severed by the knife 78v, it is carried by the moving radome beneath a presser roll 78w mounted on the end of a rack bar 78x slidable longitudinally of itself between rollers forming an inclined guide. The bar 78x has teeth engaged by a pinion 78g. The latter is driven by a torque motor 78z3 through a pinion 78z, shaft 78z1 and coupling 78z2. The torque motor is energized to continuously urge the presser roll 78w against the surface of the radome in the path of the pieces of tape applied thereto so as to press such tape firmly against the radome. The use of the torque motor 78z3 and rack bar 78x to exert pressure on the tape through the roll 78w makes possible exerting substantially uniform pressure on the applied pieces of tape independently of variations in the radius of curvature of the radome encountered as the radome is moved lengthwise during the correction procedure. Thus, as the radius of curvature becomes smaller roll 78w is forced upwardly and inwardly of the correction applicator, yet the force exerted by the roll remains virtually unchanged because of the independence of torque of motor 78z3 of its rotary position, whereas if a spring were used to urge the roll into contact with the radome, the pressure exerted by the roll would vary with radius of curvature of the radome.

Figure 10:
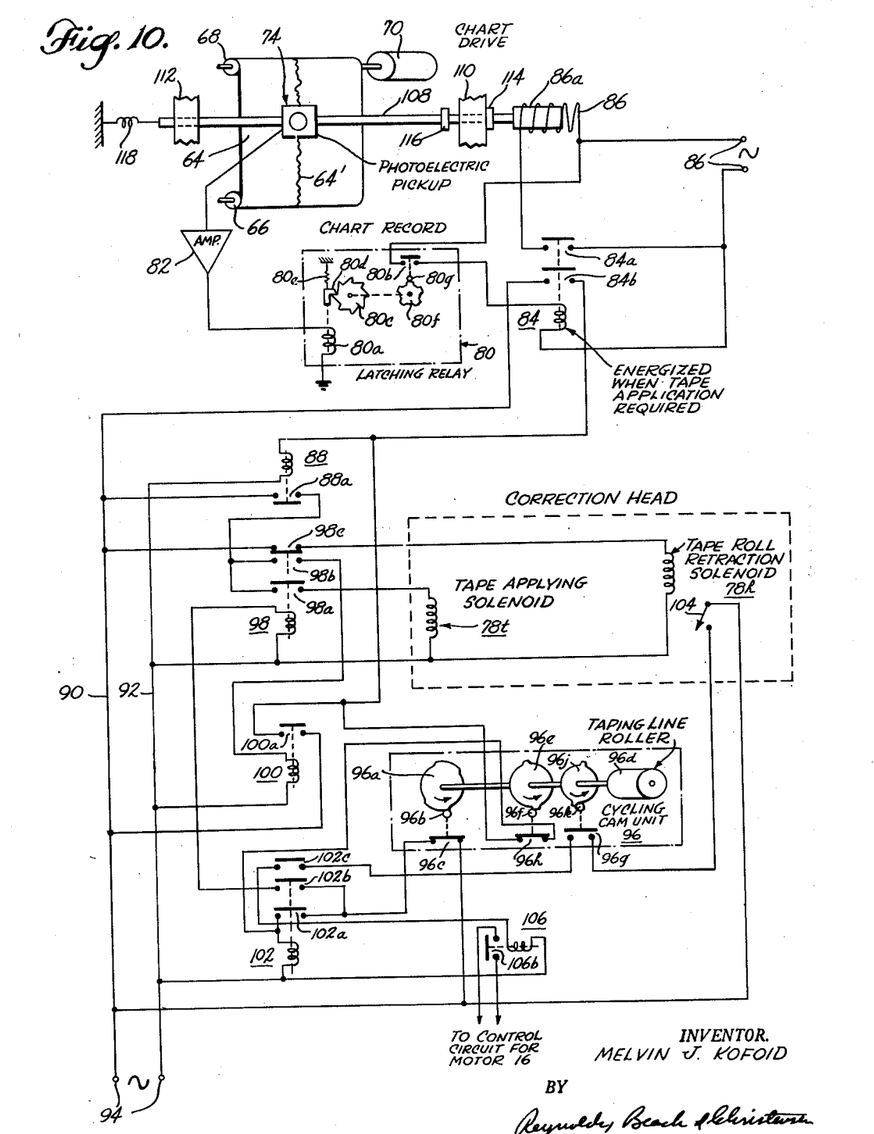
Figure 10 is a schematic view of the correction head controls shown generally in Figure 1, the view further illustrating the photoelectric pick-up apparatus for scanning the graph line representing the record deviations of radome electrical wall thickness from the selected value, and the operating elements of the correction head energized by said controls.

Figure 10 illustrates the correction head control apparatus and the manner in which the photoelectric pick-up means causes operation thereof to actuate the tape applicator.

Figure 8:
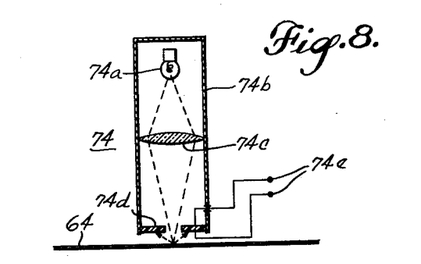
Figure 8 is a simplified sectional side view of a photoelectric pick-up device of a type employed in Figure 1.
Figure 9:
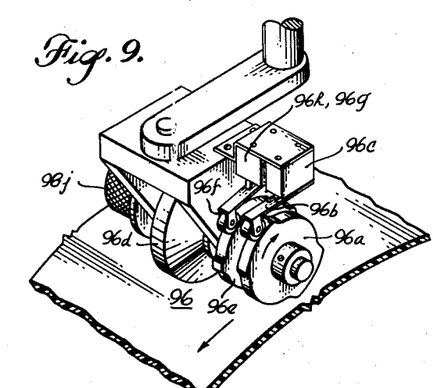
Figure 9 is a perspective view of the cam unit comprised in the correction head controls.

The output of photoelectric pickup 74, comprising an electrical impulse developed with each crossing of the electrical wall thickness graph line 64', is transmitted to the coil 80a of latching relay 80 through amplifier 82, which converts such impulse into a relay energizing impulse. A suitable photoelectric pick-up device for producing such impulses is illustrated in Figure 8. The rays from a light bulb 74a in the upper end of the housing 74b are focused by a lens 74c to a fine spot or point on the surface plane of the chart paper 64. An annular photosensitive element 74d is mounted in the lower end of the housing 74b. The light rays pass through a central opening in the photosensitive element 74d, and any reflections from the chart paper are cast upon the photosensitive lower face of the element. When the light spot falls on the plain (light) chart paper, the total quantity of light incident upon the photosensitive element is relatively large, whereas when the light spot falls upon the (dark) graph line the light intensity is considerably diminished. This change in light intensity is converted into a corresponding change in the electrical signal appearing in the output terminals 74e of the photosensitive element.

The latching relay 80 is so constructed that its controlled contacts 80b are closed on every other impulse from the photoelectric pickup and opened on the intervening impulses therefrom. There are various types of latching relays or equivalent devices which will accomplish this result, that illustrated being merely representative. A toothed wheel 80c is engageable by a spring-returned dog 80d, and the wheel rotated by one increment, representing the tooth pitch of the wheel, with each energizing impulse applied to the relay coil 80a. The spring 80e returns the dog to its rest position on termination of energization of the coil, preparatory to the next impulse. A switch control cam wheel 80f is rotatively connected to the toothed wheel 80c and has half the number of cam lobes or rises as the wheel 80c has teeth, spaced at equal intervals around its periphery. The cam follower 80g connected to the switch contactor element opens the switch contacts when the follower is on a lobe or rise of the cam and closes the switch when the follower is on a dwell or valley of the cam. Thus upon one incremental shift of the toothed wheel the switch contacts 80b are opened and upon the next incremental shift of such wheel the switch contacts are closed by the cam and follower arrangement, the process recurring indefinitely with recurrence of energizing impulses applied to relay coil 80a.

The switch contacts 80b are connected in an energizing circuit for the coil of a relay 84, such energizing circuit including the terminals 86 to which alternating voltage is applied. The relay 84 has two sets of contacts closed by and during energization of the relay. The first set, 84a, form an energizing circuit for the solenoid 86 which functions in the curve-hopping device to be described. The second set 84b forms an energizing circuit for the coil of a relay 88 through conductors 90 and 92 having energization terminals 94, to which alternating voltage is applied. Thus, when the spot of light of the photoelectric pickup 74 is on one side of the graph line 64', the relays 84 and 88 are energized, whereas when the spot of light falls on the opposite side of the graph line 64' these two relays are deenergized. The contacts 88a of relay 88 are closed when the relay is energized.

Energization of relays 84 and 88 is chosen to represent the condition under which the electrical wall thickness of the radome measured is less than the required value, i.e. the graph line (Figure 1A) crosses line Y—Y from the region between this line and base line X—X, so that application of dielectric tape is required to produce an increase in such thickness. This is one of the conditions required to energize the tape-applying solenoid 78t. There is a second condition to energize such solenoid and that is the condition of maintaining a minimum spacing between pieces of tape which may be applied to the radome in successive locations around any circumferential zone thereof. The second condition, namely the interval spacing condition, is determined by operation of the cycling cam unit 96. The energizing circuit for the tape-applying solenoid 78t includes the contacts 98a of relay 98, closed by energizations of such relay, and the contacts 88a of relay 88, extending between conductors 90 and 92.

Relay 98 has a second set of contacts 98b which are closed with energization of relay 98 to form an energizing circuit for the coil of relay 100, such energizing circuit including the closed contacts 88a of relay 88 and the conductors 90 and 92. Relay 100 is a holding relay whose contacts 100a form a holding circuit for the coil of relay 88 during continued energization of the coil of relay 100.

The cycling cam unit 96 includes the long dwell cam 96a having a follower 96b by which the switch contacts 96c are closed when the follower engages either of the two lobes or rises of this cam. The circumferential length of these cam lobes corresponds to the desired applied taped strip length, whereas the circumferential spacing between these cam lobes correspond to the desired taping intervals. The cam is rotated by a roller 96d which runs on the periphery of the radome at the longitudinal position of the taping head itself, i.e. of the taping roll 78k (Figure 4).

The cycling cam unit 96 includes a short dwell cam 96e the rises or lobes of which are circumferentially positioned at the leading edges or shoulders of the lobes on the cam 96a. The cam follower 96f controls the contactors of the set of switch contacts 96h, which contacts are closed when the cam follower 96f rides on the lobes of the short dwell cam. This cam is rotated by the same shaft as the cam 96a.

A twist knob 98j permits turning both cams by any desired rotational angle independently of rotational movement of the radome. Preferably such cams are rotated a quarter of a turn in this manner between correcting successive circumferential zones on the radome. As a result the applied tape pieces will assume a checkerboard pattern in corrected areas, making for maximum uniformity of the correction effect.

The energizing circuit for relay 98 includes the contacts 102b of relay 102, and the contacts 96c of the long dwell cam switch. In order to form this energizing circuit relay 102 must be energized. The energization circuit for relay 102 is formed initially, provided relay 84 is energized to close its contacts 84b when tape application is required, by closure of the contacts 96h of the short dwell cam switch such energizing circuit extending through the closed contacts 84b. Relay 102 has a second set of contacts 102a which close upon energization of the relay and form a holding circuit for this relay through the closed contacts 96c of the long dwell cam switch. Thus even though contacts 96h open shortly after they are closed, due to the shortness of the lobes of the short dwell cam 96e, relay 102 remains energized to effect continued energization of relay 98, hence of the tape applying solenoid 78t.

Even though the necessity for tape application ceases and solenoid 84 becomes deenergized during the dwell period of long dwell cam 96a (contacts 96c closed), this action does not shorten the length of the strip of tape applied. Instead, the continued closure of cam switch contacts 96c until the follower 96b drops off the trailing end of the cam lobe continues the energization of solenoid 78t so that a fixed length of tape is laid by the apparatus each time the photoelectric pick-up device dictates the need for a wall thickness correction at the instant the cam control switches are closed initially. Thus the function of the long dwell cam is to assure a definite length of tape being applied under all conditions when corrections are required.

The function of the contacts 96h of the short dwell cam 96e is to prevent application of a strip of correction tape in the event relay 84 becomes energized during the period of dwell of the long dwell cam follower 96b. This is necessary in order to maintain predetermined minimum spacing between any two successively applied strips of tape. Thus, if the need for correction does not appear during the dwell period of the short dwell cam 96e its subsequent appearance during the potential tape applying period can have no effect on relay 102 since contacts 96h are reopened.

The function of relay 100 is to cooperate with the long dwell cam 96a in the application of a predetermined minimum length of tape to the radome despite deenergization of relay 84 before completion of the tape application. Relay 100 accomplishes its part in performing that function by holding relay 88 energized in order to maintain contacts 88a closed, which is one of the conditions for energization of tape applying solenoid 78t, the other condition being continued energization of relay 98 by closure of cam switch contacts 96c and energization of relay 102 thereby.

Relay 98 has a third set of contacts 98c which are closed when the relay is deenergized, thereby to energize the tape roll retraction solenoid 78h through conductors 90 and 92. It will be remembered that the function of this solenoid is to strip a length of tape from its adhesive bond to the main roll preparatory to feeding a length of tape through the applicator for application to the radome. Thus, upon completion of each tape application a length of tape is stripped from the roll automatically by closure of relay contacts 98c, preparatory to the next application of tape.

It is desirable to provide apparatus which automatically renders the machine inoperative to rotate the radome in the event the supply of tape becomes exhausted. This will attract the attention of the operator or attendant and thereby avoid time loss and useless recycling of the controls. It will also avoid the problem of accurately locating the correction head in relation to the radome for recommencing correction operations after the tape supply is replenished. A switch 104 mounted on the correction head support arm 78b is actuated to close its contacts when the arm 78e is held drawn to its limit position by spring 78e1. A third cam 96j in the cycling cam unit has short lobes positioned centrally, in terms of angular relationships, to the lobes of long dwell cam 96a. A cam follower 96k is engageable by the lobes of cam 96j to close switch 96g in series with switch 104 and the coil of relay 106. A third set of contacts 102c in relay 102 are in this series circuit, so that an energizing circuit for relay 106 can only be formed if the apparatus requires tape application (i.e. relay 102 energized) at the time switches 96g and 104 are closed. If no tape is on the roll, switch 104 will be closed by the failure of the tape roll support arm 78e to be drawn toward the operating end of the correction head, and closure of cam switch contacts 96g at a time when tape application is required will cause energization of relay 106 to close contacts 106b thereof. These relay contacts are connected in a deenergizing circuit (not shown) for the motor 16 revolving the radome. When contacts 106b are closed the machine is shut down until a fresh supply of tape is installed in the correction head.

It was mentioned above that special apparatus is provided to accelerate and insure graph line crossing by the focal spot of the photoelectric pick-up device. Such apparatus is referred to as a "curve-hopper" and is illustrated in the upper portion of Figure 10. Referring to Figure 1a, the tracking line Y—Y is the line followed by the focal point of the photoelectric pick-up device 74 as the graph paper moves relatively thereto corresponding to circumferential movement of the radome relative to the correction head. There are certain graph line configurations which present no problem requiring the aid of the curve-hopper, and these are represented by approaches of the graph line to the tracking line Y—Y at a relatively steep angle, as at points m, n, o and p. However, there will be instances when the graph line becomes substantially tangential to the tracking line Y—Y as shown at q in Figure 1a, and when this condition is first met the photoelectric pick-up device will respond correctly enough as to a need for application of correction to the radome wall thickness. However, when the instant need for correction is over and the graph line recedes from the tracking line Y—Y, there can be no reverse response of the photoelectric pickup and on the next succeeding intersection r the apparatus will respond as if the need for correction is terminated, whereas in fact the need for another correction has just arisen.

In order to avoid this type of difficulty the "curve-hopper" is employed. This device consists of a means which automatically and abruptly moves the photoelectric pick-up device and graph paper relatively in a sense which accelerates and completes a curve crossover whenever the focal spot of the photoelectric pickup completes its approach to the graph line. This is accomplished in the illustration by the mounting of the photoelectric pick-up unit on the supporting bar 108 which slides in supports 110 and 112 lengthwise of itself and transversely to the running length of the graph paper. Such movement of the bar 108 occurs between limit positions established by the stops 114 and 116. Only slight shifting of the photoelectric pickup is permitted by these stops and the spacing of the stops is exaggerated in the drawing for purposes of illustration. A displacement of approximately the thickness of the graph line is ordinarily adequate for the purpose. A spring 118 normally holds the assembly in one limit position. Energization of solenoid 86 upon and during energization of relay 84 moves the assembly to its opposite limit position, the solenoid having an armature 86a which is connected to the slide rod 108. As previously mentioned, the spacing is such that, with reference to Figure 1a, as the graph line approaches incidence point q the impulse delivered by the photoelectric pickup produces energization of relay 84 and shifts the photoelectric pickup focal point abruptly a short distance toward the base line X—X to complete the crossover of the graph line. When the point S is reached, at which the tangency between the graph line and the normal tracking line Y—Y terminates and the graph line departs from the tracking line, the pick-up focal point again falls on the graph line and another impulse is delivered to the relay 80, producing deenergization of relay 84, hence deenergization of the solenoid 86. The spring 118 thereby returns the photoelectric pick-up device to its normal position on the tracking line Y—Y and assures recrossing of the graph line by the pick-up focal point.

In carrying out the electrical wall thickness measurement and correction method in the preferred manner with the aid of the novel apparatus disclosed herein a radome is first suitably fastened by temporary connections to the support ring 13 with the axes of the ring and radome coincident. With the ring installed in the roller bearing guides 10a, 10b it is free to revolve about its axis on the carriage 10, and the longitudinal arc of the top side of the radome is disposed parallel to the carriage tracks 12. The carriage is then moved along the tracks until the common axis of the transmitting and receiving horns intersect the middle of the endmost circumferential zone on the radome required to be measured for correction. Conveniently this initial zone is near the radome tip. Determination of the radome's arrival at such location is made by reference to the carriage position indicator 77. The recording chart 64 is then adjusted, as by means of the reset control 72, with a fresh supply of graph paper ready to be drawn past the recording pen 52 by movement of the chart drive servo synchronously with rotation of the radome. With the microwave oscillator 34 in operation, and with the radome initially rotated to a predetermined starting position, the rotational drive motor 16 is started to rotate the radome through one complete turn. The pen 52 simultaneously records the electrical wall thickness deviations on graph strip 64 for the initial zone being scanned. The carriage position indicator reading is normally marked next to this recording for future identification. The carriage drive motor 20 is then energized to advance the carriage to the next succeeding circumferential zone to be measured on the radome, and the recording process is repeated. This procedure is followed repeatedly until individual zone electrical wall thickness recordings have been made and identified for substantially the full length of the radome. The spacing between successive recordings is uniform but is not critical. It should not be greater than a small fraction of the effective width of the microwave energy beam transmitted by the radar to be housed within the radome. Excessive spacing of the successive zones would reduce the refinement of the corrections and leave intervening regions uncorrected, whereas correction zones too closely spaced unduly lengthens the measurement and correction procedure without commensurate improvement of the end product.

After the recordings have been made the radome is returned to its original starting position and the chart is turned back by the reset control 72 to its initial position relative to the photoelectric pickup 74 and not the pen 52. A supply roll of dielectric patching tape is installed in the correction head 78. With the modifier adjustment 65 correctly set with reference to the minimum electrical wall thickness toward which the apparatus is to correct, the drive motor 16 is again started and the initial zone scanned, accompanied by "playback" of the graphical record of electrical wall thickness, point for point, through the photoelectric pickup to control operation of the correction head 78. When, by reference to Figure 1A, for example, the graph line rises above line Y—Y, indicating insufficient electrical wall thickness at the particular radome wall location represented, the resultant impulse from the photoelectric pickup 74 energizes latching relay 80, which in turn is phased so as to energize relay 84 and hold the latter energized although the original photoelectric pickup pulse terminates. This energizes relay 88 preparatory to the subsequent instant the cam followers of the cycling cams 96a and 96b are actuated by the lobes of these cams, whereupon relay 102 is actuated to energize relay 98 and form an energizing circuit for tape applying solenoid 78t. The length of tape applied is determined by the follower of long dwell cam 96a dropping from the cam lobe whereupon relay 98 is deenergized, as is solenoid 78t, and the spring 78s" raises the tape applicator arm 78r and severs the tape on knife edge 78v. Deenergization of relay 98 forms the energizing circuit for tape roll retraction solenoid 78h and strips a fresh length of tape from supply roll 78c.

If the graph line still lies beyond line Y—Y at the next and succeeding actuations of cam followers 96b and 96f by the respective cam lobes, one or more additional pieces of tape are applied, the spacing intervals between them being determined by the angular separation of the lobes of the cams in relation to the radius of the cam drive roll 96d. However, when next the graph line recrosses tracking line Y—Y in the direction toward base line X—X, relay 88 becomes deenergized and as long as it remains that way, in correspondence with the condition of adequate radome electrical wall thickness, the recurrent closures of the cam switches 96c and 96h have no effect on the correction head.

The process of correction scan and graph line tracking is repeated with the apparatus for each successive zone for which a recording is made until the entire radome surface has been scanned. Preferably the cam phasing knob 96j is rotated a quarter of a turn between zonal scans so that the tape is applied in a checkerboard pattern as previously stated.

As previously mentioned, the corrections are applied "soft" by the utilization of tape of limited thickness and area, and after the correction procedure has been completed once, the radome is again subjected to the electrical wall thickness measurement procedure and more recordings made. The correction procedure is then repeated on the basis of these new recordings, applying the tape patches preferably in the open spaces between patches previously applied, by properly phasing the cycling cam unit. This procedure of alternate remeasurement and recorrection of the radome may be repeated until the desired refinement of thickness correction is achieved in the end product. Usually one remeasurement and related recorrection process is sufficient to achieve the required accuracy.

The radome bearing the patches of correction tape on its interior surface is then removed from the carriage 10 and is heated in order to react the thermal setting adhesive of the tape for making the corrections permanent.

It will be recognized that the invention, described in its presently preferred embodiment and mode of practice, has features and aspects which vary in scope and application and that in these respects the invention is not necessarily limited to the details of the examples and illustrations upon which the present disclosure is based. In this regard it will be noted that, within the framework of the novel principles disclosed, the application of thickness modification elements may in the broader sense be in a sense to reduce electrical wall thickness as well as to increase such thickness when required. In that sense corrections which have the effect of or constitute thickness reductions in a proper case are also contemplated.

I claim:

1. The method of correctively modifying toward a desired predetermined effective value the electrical thickness of a dielectric material wall which initially approximates said value, said wall being adapted to permit propagation of a beam of electromagnetic wave energy of selected wavelength transversely therethrough, comprising the steps of measuring deviations from said value in the different areas of the wall to be traversed by the beam, and applying to one side of the wall, at discrete noncontiguous locations, within those areas having such deviations greater than a predetermined amount, thickness modification corrections which produce a small fractional charge in the dielectric material thickness, and thereby in the electrical thickness, of said wall only in the specific areas actually occupied by such corrections but which by their presence thereby also change the effective dielectric thickness also of areas immediately surrounding such specific areas, with respect to the net effect thereof on the wave fronts of energy in such propagating beam.

2. The method defined in claim 1, wherein the thickness modification corrections comprise pieces of dielectric tape adhesively bonded to the wall surface.

3. The method defined in claim 2, wherein the pieces of dielectric tape are substantially of the same thickness, of the same length and of the same width.

4. The method defined in claim 1, wherein the wall comprises a radome formed initially with the electrical wall thickness thereof generally thinner than the desired predetermined effective value, and the thickness modification corrections comprise pieces of dielectric tape adhesively bonded to the radome wall.

5. The method defined in claim 4, wherein the pieces of dielectric tape are substantially of the same thickness, of the same length and of the same width.

6. The method of correctively modifying toward a predetermined effective value the electrical wall thickness of a radome of elongated generally ogival form adapted to transmit a beam of electromagnetic wave energy therethrough, comprising measuring the electrical wall thickness deviations from said effective value, including the steps of directing a test beam of microwave energy from a source to a receiver transversely through the radome wall with predetermined relative incidence angle, polarization and spacing of said source in relation to the wall, producing relative rotation of said radome about the longitudinal axis thereof and, upon completion of each cycle of rotation, shifting said radome longitudinally relative to said test beam by a predetermined amount, thereby progressively and systematically to scan substantially the entire wall area of said radome with said beam while maintaining substantially constant said relative test beam incidence angle, polarization and spacing, recording variations in relative electrical phasing between microwave energy directly from said source and microwave energy received in said receiver after passing from said source through the radome wall, and applying to the inside face of the radome wall a plurality of discrete thickness corrections at separate noncontiguous locations in accordance with the recorded deviations in electrical phasing from a predetermined value to change the effective electrical thickness of said wall in selected areas toward said predetermined value in respect to the effect of said wall on the wave fronts of energy in said first beam.

7. The method defined in claim 6, wherein the electrical wall thickness is generally less than the desired effective value and wherein the thickness modification corrections comprise strips of dielectric tape of predetermined length and width applied adhesively to the radome wall in successively located circumferential zones thereon and at predetermined minimum spacing between successively applied strips in each such circumferential zone.

8. The method defined in claim 7, wherein the individual strips of dielectric tape have an electric thickness correction effect less than the correction effect required at least in some areas of the radome wall to increase the electrical thickness thereof to the desired effective value, and wherein the electrical wall thickness deviations of the radome bearing such tape strips are remeasured and recorded, and additional correction tape strips are applied thereto in the interval spaces between the previously applied strips, in accordance with the latter recorded deviations.

9. The method defined in claim 6, wherein the electrical wall thickness is generally less than the desired effective value and wherein the thickness modification corrections comprise strips of dielectric tape of predetermined length and width applied adhesively to the radome wall in successively located circumferential zones thereon and at predetermined minimum spacing between successively applied strips in each such circumferential zone, the strip-separating intervals of each such zone being in circumferential registry with the strip locations of the next adjacent zones, thereby to produce a checkerboard pattern of applied strips in areas requiring correction thereby.

10. Apparatus for measuring deviations from a predetermined value, of the electrical thickness of a dielectric radome of elongated generally ogival form adapted to pass a beam of electromagnetic energy therethrough, comprising means for supporting said radome in test position, a microwave energy source adapted to pass a test beam of microwave energy through the wall of said radome in test position with predetermined relative incidence angle, polarization and spacing of said source in relation to said radome wall, a microwave energy receiver positioned fixedly in relation to said source in said beam to receive microwave energy from said source after passing through said wall, said support means including means to move the radome generally longitudinally thereof and to rotate said radome about the longitudinal axis thereof to produce relative motion between said wall and said source in the general plane of said wall where it is intersected by said test beam for systematically scanning said wall relative to the source and receiver while maintaining the relative test beam incidence angle, polarization and spacing of the wall relative to the source, and means to indicate variations in relative electrical phasing between microwave energy directly from said source and microwave energy received in said receiver after passing through said wall, said support means comprising curved track means extending generally longitudinally alongside of the elongated radome, and carriage means rotatively supporting the radome and engaging said track means to move said radome generally longitudinally of itself along said track means, the source and receiver being positioned relative to said track means to direct the microwave energy test beam through a side of said radome removed from said track, said track being generally curved in conformity with the longitudinal curvature of said radome side and in a plane generally parallel to the longitudinal plane of curvature of said radome side, thereby to maintain constant said relative test beam incidence angle, polarization and spacing throughout longitudinal movement of said radome.

11. The apparatus defined in claim 10, wherein the means to indicate variations in relative electrical phasing comprise a magic tee having two input (E and H) arms and two output arms, the receiver being connected to one of said input arms, the microwave energy source being connected to the other of said input arms, similar microwave energy amplitude detectors in said output arms respectively, adjustable electrical phase shifter means interposed in the connection to one of said input arms, servo means connected to said phase shifter means to vary the effective electrical length of said latter connection, thereby to vary the intensity relationship between microwave energy in said output arms, circuit means controlled by energization of said two detectors and in turn energizing said servo means in accordance with differences of intensity of microwave energy in said output arms in a sense to reduce said differences, and means indicating changes in adjustment of said phase shifter, thereby to indicate said variations in relative electrical phasing.

12. The apparatus defined in claim 11, and means to record the variations in electrical phasing graphically, including a recording element, a record medium on which said recording element produces the record, and means operable in coordination with the rotary and longitudinal movements of the radome effected by the support means to make a separate graphical record for each zonal region of the radome scanned by the test beam.

13. Apparatus for correctively modifying toward a predetermined effective value the electrical wall thickness of a radome of elongated generally ogival form, comprising means for recording deviations from said effective value, of the electrical wall thickness of the radome, said means comprising means for supporting said radome in test position, a microwave energy source adapted to pass a test beam of microwave energy through said radome in test position with predetermined relative incidence angle, polarization and spacing of said source in relation to the radome wall, a microwave energy receiver positioned fixedly in relation to said source in said beam to receive microwave energy from said source after passing through said radome wall, means on said support to rotate said radome about the longitudinal axis thereof, means to move said supported radome longitudinally thereof, thereby to scan a succession of circumferentially extending zones of the radome wall by the test beam, means to record deviations in relative electrical phasing from a predetermined value between microwave energy directly from said source and microwave energy received in said receiver after passing through the radome wall for each such circumferential zone, said deviations representing electrical wall thickness deviations, correction applicator means operable for applying wall thickness corrections to one side of the radome wall around any of selected circumferentially extending zones thereof, means for scanning the record of electrical thickness deviations for each such circumferential zone, said latter means being connected to said correction applicator to operator the same automatically in response to a recorded deviation exceeding a predetermined amount, and means operable to coordinate scanning of the zone records with positioning and movement of the radome relative to the correction applicator means, whereby the electrical wall thickness of the radome is correctively modified in accordance with said recorded deviations of electrical wall thickness in the different circumferentially extending zones.

14. The apparatus defined in claim 13, wherein the support means comprises curved track means extending generally longitudinally and alongside of the elongated radome and carriage means rotatively supporting the radome and engaging said curved track means to move said radome generally longitudinally of itself along said track means, the source and receiver being positioned relative to said track means to direct the microwave energy test beam through a side of said radome removed from said track, said track being generally curved in conformity with the longitudinal curvature of said radome side and in a plane generally parallel to the longitudinal plane of curvature of said radome side, thereby to maintain constant said relative test beam incidence angle, polarization and spacing throughout longitudinal movement of said radome.

15. The apparatus defined in claim 14, wherein the means to record deviations in electrical wall thickness comprise a magic tee having two input (E and H) arms and two output arms, the receiver being connected to one of said input arms, the microwave energy source being connected to the other of said input arms, similar microwave energy amplitude detectors in said output arms respectively, adjustable electrical phase shifter means interposed in the connection to one of said input arms, servo means connected to said phase shifter means to vary the effective electrical length of said latter connection, thereby to vary the intensity relationship between microwave energy in said output arms, circuit means controlled by energization of said two detectors and in turn energizing said servo means in accordance with differences of intensity of microwave energy in said output arms in a sense to reduce said differences, and means recording changes in adjustment of said phase shifter, thereby to record said deviations in electrical wall thickness.

16. The apparatus defined in claim 15, wherein the correction applicator means comprises tape applying means adapted to apply dielectric tape to the radome wall circumferentially thereof accompanying rotation of the radome.

17. The apparatus defined in claim 16, and cycling means operable by rotation of the radome, causing the operation of said tape applying means by said record scanning means to be intermittent, thereby to apply the tape in pieces of predetermined length at predetermined minimum interval spacing thereof around the circumferential zones of the radome wall.

18. The apparatus defined in claim 17, wherein the cycling means includes means adjustable to vary the relative phasing of the interruptions of the tape applying means to permit staggering the pieces of tape applied in one circumferential zone in relation to those applied in another.

19. The apparatus defined in claim 18, wherein the recording means includes means for producing a line recording on recording paper and wherein the record scanning means includes photoelectric pick-up means directing a beam of light on the record paper and producing an electrical impulse automatically each time said light beam falls anew on the record line, said recording means recording paper and photoelectric pickup means being relatively movable with the light beam focussed on a point representing zero deviation on the recording paper.

20. The apparatus defined in claim 19, and means operated in response to each impulse from the photoelectric pick-up means to shift the light beam thereof abruptly transversely in relation to the record line by an amount exceeding the line thickness and in the direction which accelerates complete crossing of the line by the light beam focussed thereon.

21. The apparatus defined in claim 13, wherein the correction applicator means comprises tape applying means adapted to apply dielectric tape to the radome wall circumferentially thereof accompanying rotation of the radome, said tape applying means.

22. The apparatus defined in claim 21, and cycling means operable by rotation of the radome, causing the operation of said tape applying means by said record scanning means to be intermittent, thereby to apply the tape in pieces of predetermined length at predetermined minimum interval spacing thereof around the circumferential zones of the radome wall.

23. The apparatus defined in claim 22, wherein the cycling means includes means adjustable to vary the relative phasing of the interruptions of the tape applying means to permit staggering the pieces of tape applied in one circumferential zone in relation to those applied in another.

24. In combination with apparatus for correctively modifying electrical wall thickness to approach a desired thickness, means to record on a line graph thickness variations of the wall in different areas, and correction applying means operable to apply electrical thickness correction elements to such wall in different areas thereof, apparatus for detecting variation of a graph line representing the recorded electrical thickness above or below a predetermined value representing the desired thickness on a graph recording medium, comprising point-scanning means having a point-scanning element operatively positioned to scan a predetermined line of constant graph value on said recording medium, means operable to effect relative movement between said point-scanning means and said medium in a direction parallel to said line of constant graph value thereon, means permitting slight relative offset movement between said point-scanning means and graph recording medium in a direction transverse to said scan line, said point-scanning means being responsive to intersection of said graph line and said point-scanning element and adapted to control operation of said correction applying means thereby, control means actuated by said point-scanning means with each such response thereof, and means controlled by said latter means and operable on alternate actuations of said control means to produce such relative offset movement abruptly in one direction and operable on the intervening alternate actuations of said control means to produce such relative offset movement abruptly in the opposite direction, thereby to accelerate and insure complete graph line crossing in either direction of approach thereto relatively by said scanning element.

25. The combination defined in claim 24, wherein the point-scanning means comprises means to focus a beam of light to a point spot on the recording medium, and a photoelectric element directed toward said spot to detect the variation in reflected light when said spot intersects the graph line.

26. In apparatus for correctively modifying wall thickness of a member toward a predetermined value, including detecting means responsive to deviations from said value in different successive areas on said member, a correction applicator device operable for applying a corrective medium to said wall, said device including an electrically energizable element arranged for operating said device to apply said medium continuously during energization of said element, carriage means for effecting relative movement between said member to be corrected and said device progressively while maintaining said member in correction-receiving position relative to said device, and means for controlling energization of said element, said means comprising energizing circuit means for said element including a source of electrical energy, first and second switch means interposed in said circuit means for completing said circuit means solely during simultaneous actuation of both of said switch means, first control means operated synchronously with said carriage means for actuating said first switch means intermittently at predetermined intervals as a function of relative movement effected between said carriage means and said device, and second control means controllable by said detecting means for actuating said second switch means independently of said first switch means, said detecting means being coordinated with said applicator device in terms of positional correspondence relative to the member.

27. The combination defined in claim 26, and holding means for the second switch means, controlled by the first control means to prevent deactuation of the second switch means by the second control means until deactuation of the first switch means by the first control means, whereby the minimum length of application of the corrective medium along the member is determined by the duration of the period of actuation of the first switch means by the first control means.

28. The combination defined in claim 27, wherein the first control means includes disabling means operated by said relative movement momentarily only during initiation of each actuation period of said first switch means to prevent actuation of said first switch means during any such period, said disabling means being controlled by said second control means to prevent operation of said disabling means during actuation of said second switch means, whereby initiation of actuation of said second switch means at an intermediate point in any such period is ineffective to energize the element for operating the device.

29. Apparatus for measuring deviations from a predetermined value, of the electrical thickness of a dielectric wall member adapted to pass a beam of electromagnetic energy therethrough, comprising means for supporting said wall member in test position, a microwave energy source adapted to pass a test beam of microwave energy through said wall member in test position with predetermined relative incidence angle, polarization and spacing of said source in relation to said wall member, a microwave energy receiver positioned fixedly in relation to said source in said beam to receive microwave energy from said source after passing through said wall member, means to produce relative motion between said wall member and said source in the general plane of said wall member where it is intersected by said test beam for systematically scanning substantially the entire area of said wall member, and means to indicate variations in relative electrical phasing between microwave energy directly from said source and microwave energy received in said receiver after passing through said wall member, said means to indicate variations in relative electrical phasing comprising a magic tee having two input (E and H) arms and two output arms, the receiver being connected to one of said input arms, the microwave energy source being connected to the other of said input arms, similar microwave energy amplitude detectors in said output arms respectively, adjustable electrical phase shifter means interposed in the connection to one of said input arms, servo means connected to said phase shifter means to vary the effective electrical length of said latter connection, thereby to vary the intensity relationship between microwave energy in said output arms, circuit means controlled by energization of said two detectors and in turn energizing said servo means in accordance with differences of intensity of microwave energy in said output arms, circuit means controlled by energization of said two detectors and in turn energizing said servo means in accordance with differences of intensity of microwave energy in said output arms in a sense to reduce said differences, and means indicating changes in adjustment of said phase shifter, thereby to indicate said variations in relative electrical phasing.

References Cited in the file of this patent

UNITED STATES PATENTS

| | | |
|---|---|---|
| 2,489,092 | Larrick | Nov. 22, 1949 |
| 2,545,331 | Works | Mar. 23, 1951 |
| 2,576,621 | McBride et al. | Nov. 27, 1951 |
| 2,576,622 | McBride et al. | Nov. 27, 1751 |
| 2,596,288 | Robertson | May 13, 1952 |
| 2,635,195 | Hancock | Apr. 14, 1953 |
| 2,659,860 | Breazeale | Nov. 17, 1953 |
| 2,674,559 | Zobel | Apr. 6, 1954 |
| 2,760,898 | Voelker | Aug. 28, 1956 |
| 2,797,388 | Maybury et al. | June 25, 1957 |
| 2,798,197 | Thurston | July 2, 1957 |

FOREIGN PATENTS

| | | |
|---|---|---|
| 717,914 | Great Britain | Nov. 3, 1954 |

UNITED STATES PATENT OFFICE
CERTIFICATE OF CORRECTION

Patent No. 2,952,296                            September 13, 1960

Melvin J. Kofoid

It is hereby certified that error appears in the printed specification of the above numbered patent requiring correction and that the said Letters Patent should read as corrected below.

Column 18, line 61, for "operator" read -- operate --; column 19, line 71, strike out ", said tape applying means".

Signed and sealed this 11th day of April 1961.

(SEAL)

Attest:

ERNEST W. SWIDER
Attesting Officer

ARTHUR W. CROCKER
Acting Commissioner of Patents